United States Patent
Nakashima

(10) Patent No.: US 10,671,688 B2
(45) Date of Patent: Jun. 2, 2020

(54) INFORMATION PROCESSING APPARATUS AND DISPLAY CONTROL METHOD

(71) Applicant: CANON KABUSHIKI KAISHA, Tokyo (JP)

(72) Inventor: Kosuke Nakashima, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 113 days.

(21) Appl. No.: 15/912,988

(22) Filed: Mar. 6, 2018

(65) Prior Publication Data

US 2018/0260493 A1 Sep. 13, 2018

(30) Foreign Application Priority Data

Mar. 10, 2017 (JP) .................... 2017-046510

(51) Int. Cl.
| | |
|---|---|
| G06F 16/955 | (2019.01) |
| H04L 29/08 | (2006.01) |
| G06F 21/60 | (2013.01) |
| H04L 29/06 | (2006.01) |
| G06F 21/31 | (2013.01) |
| G06F 13/10 | (2006.01) |

(52) U.S. Cl.
CPC .......... *G06F 16/9566* (2019.01); *G06F 13/10* (2013.01); *G06F 21/31* (2013.01); *G06F 21/608* (2013.01); *H04L 63/10* (2013.01); *H04L 67/02* (2013.01); *H04L 67/025* (2013.01); *H04L 67/146* (2013.01); *H04L 67/22* (2013.01)

(58) Field of Classification Search
None
See application file for complete search history.

(56) References Cited

U.S. PATENT DOCUMENTS

2007/0086452 A1* 4/2007 Hikida ................ G06Q 10/107
                                                          370/389
2014/0164939 A1   6/2014 Tamura
2018/0322213 A1* 11/2018 Brown ............. H04M 1/72552

FOREIGN PATENT DOCUMENTS

JP          2014115895 A      6/2014

* cited by examiner

*Primary Examiner* — Angela Nguyen
(74) *Attorney, Agent, or Firm* — Rossi, Kimms & McDowell LLP

(57) ABSTRACT

According to the present invention, an information processing apparatus is provided, which comprises a unit which acquires the requested resource, a unit which stores a history of the resource, a unit which causes a display unit to display a screen that is based on the acquired resource and includes an input portion for receiving an input of a return instruction instructing that an immediately previous screen be returned to, and a unit which determines whether the immediately previous screen is a screen that is based on a resource stored in the history, and if the screen is not based thereon, transmits a message indicating that the return instruction has been made to a unit that has instructed the request of the resource, and if not, returns the screen to an immediately previous screen according to the history.

12 Claims, 13 Drawing Sheets

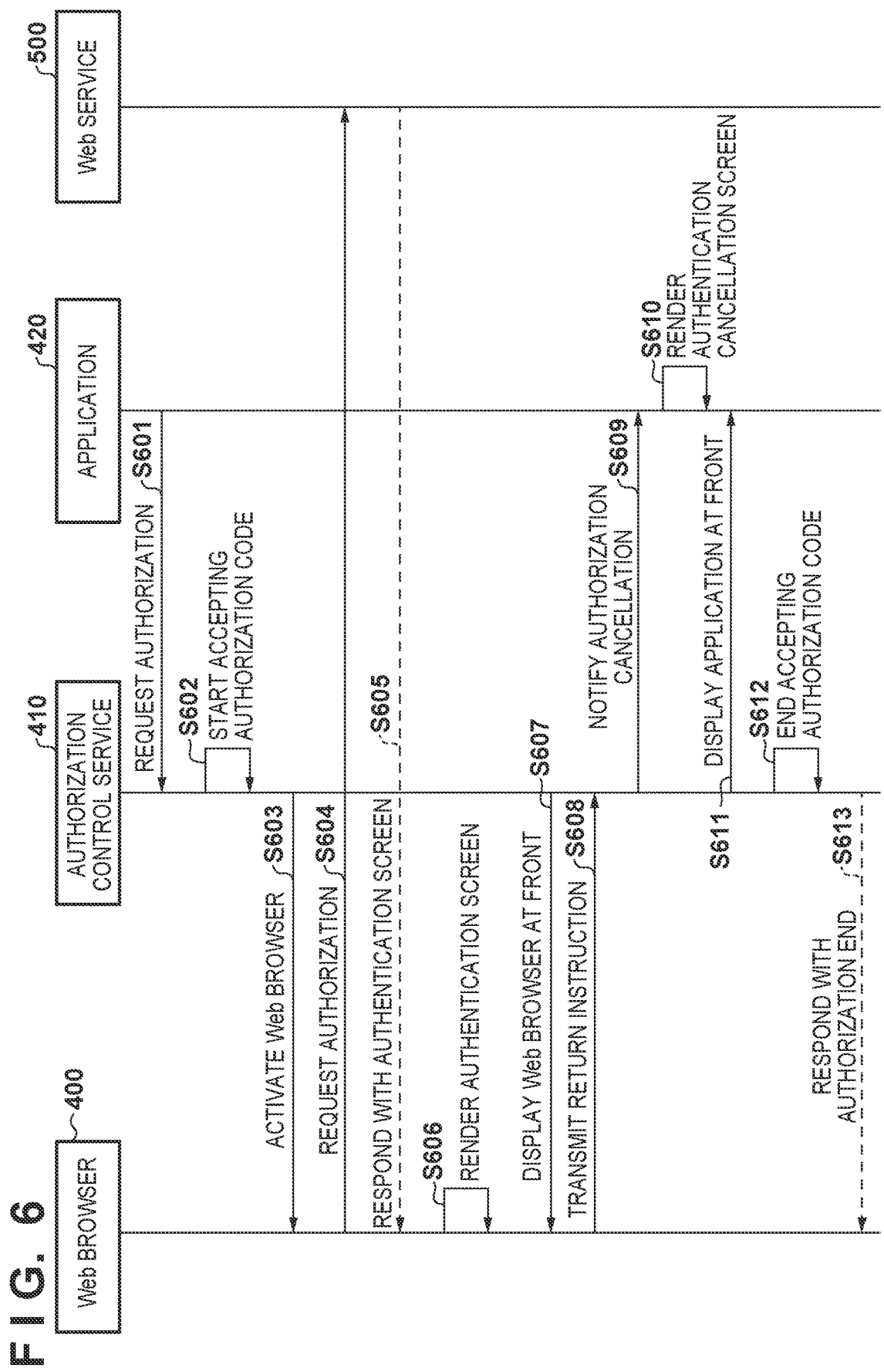

FIG. 7A https://webservice.conon/oauth?response_type=code&client_id=58a e4bc2dc2f4703910f89a893e1fee0&redirect_uri=http://127.0.0.1/auth /xxxxxx

FIG. 7B http://127.0.0.1/auth/xxxxxx?return=true

FIG. 7C http://127.0.0.1/auth/xxxxxx?code=I0y1LYh724IqxfieWqbs

FIG. 8

| APPLICATION IDENTIFIER | AUTHORIZATION COMPLETION NOTIFICATION URI |
|---|---|
| xxxxxx | /auth/xxxxxx |
| yyyyyy | /auth/yyyyyy |

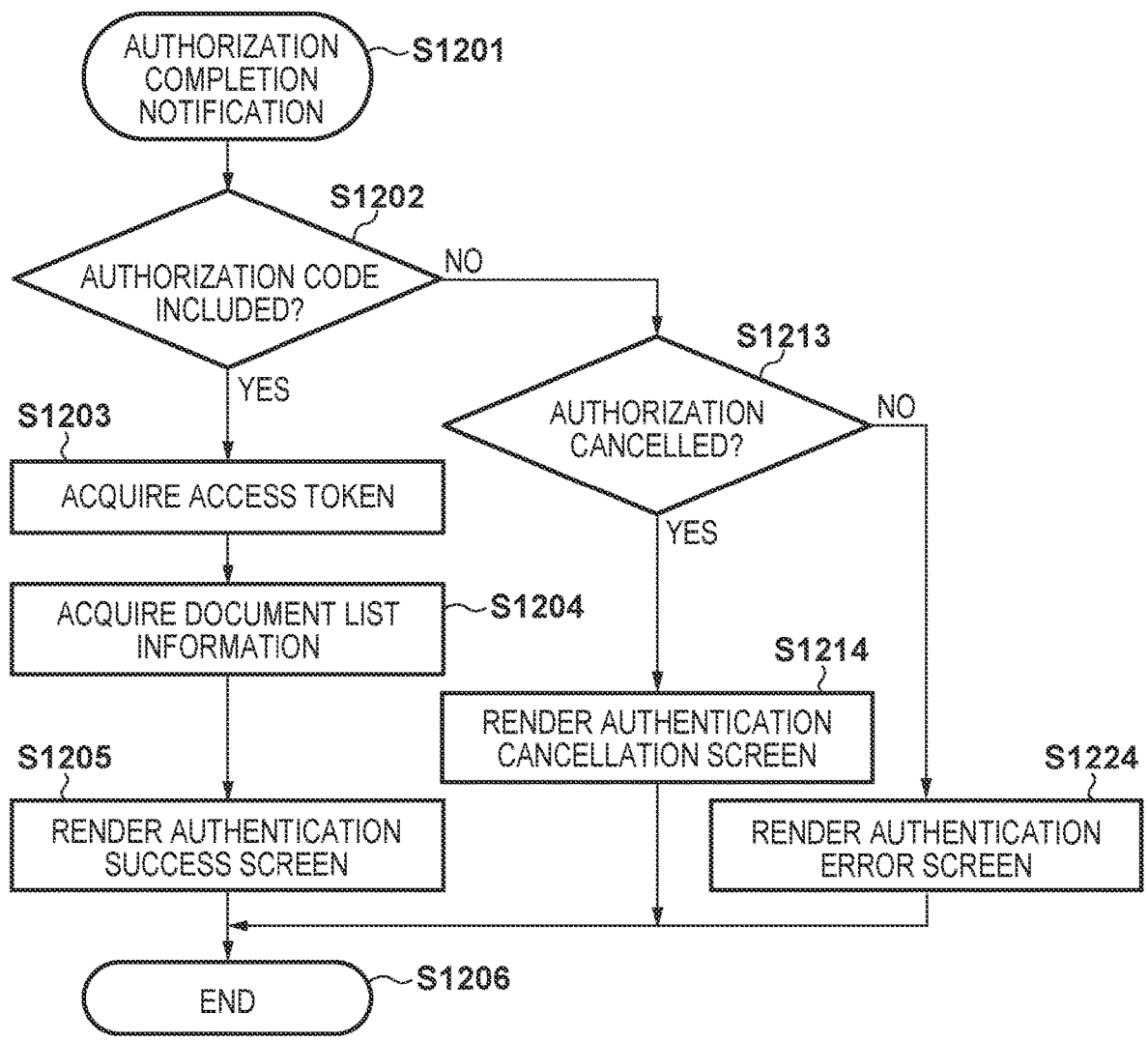

INFORMATION PROCESSING APPARATUS AND DISPLAY CONTROL METHOD

BACKGROUND OF THE INVENTION

Field of the Invention

The present invention relates to an information processing apparatus that is connected to a Web server and uses a service provided by the Web server, and a display control method.

Description of the Related Art

It is known that an information processing apparatus such as a PC is connected to a Web server on a network, and an operation screen provided by a Web application on the Web server is displayed on a Web browser included in the information processing apparatus. In this case, first, the Web browser of the information processing apparatus makes a request for an operation screen to the Web application on the Web server. Then, the Web application, in response to the request from the information processing apparatus, responds to the information processing apparatus with HTML data for allowing the Web browser to display the operation screen. The Web browser of the information processing apparatus analyzes the received HTML data, and displays the operation screen based on the description of the HTML data. Furthermore, when a user inputs an instruction via the operation screen displayed on the Web browser, the Web browser notifies the Web server of the input instruction. Also, the Web application on the Web server that has received this notification executes processing according to the input instruction.

In recent years, some image processing apparatuses that are called MFPs (Multi-Function Peripherals) including a scanner and a printer include the above-described Web browser. Meanwhile, OAuth is an industry standard used as a mechanism for authorizing the usage of a Web service by performing authentication in the Web browser. In OAuth, some authorities are transferred to a client under the agreement of a resource owner, and the client acquires permission to access the resource in the range of transferred authorities. In general, when the Web application conforms to OAuth, an authorization code is acquired by repeating redirection to an authorization server or the like on the Web browser. Also, when an embedded application conforms to OAuth, an authorization code is acquired via the Web browser. For example, in Japanese Patent Laid-Open No. 2014-115895, an embedded application installed in the MFP controls the Web browser so as to correspond to OAuth authorization.

In the case where a Web application corresponding to the OAuth authorization is used from a Web browser, even if an authentication screen that is provided by an authorization application that is the redirection destination is displayed, the user can interrupt the authentication operation by pressing a "return" button of the Web browser so as to open a URL recorded in the history. In this case, the Web browser can return from the authentication screen of the authorization application to an operation screen of the Web application. However, in the case of an embedded application such as that disclosed in Japanese Patent Laid-Open No. 2014-115895, pressing of the return button of the Web browser by the user only results in the URL recorded in the history being opened, and a problem exists in that there is no method for returning to the operation screen of the embedded application from the Web browser.

SUMMARY OF THE INVENTION

The present invention provides an information processing apparatus in which, even if a user interrupts authorization processing that is being performed by an application via a Web browser, it is possible to return to an operation screen of the application.

The present invention includes the following configuration.

According to an aspect of the present invention, there is provided an information processing apparatus comprising: an acquisition unit configured to, by requesting a resource according to an instruction, acquire the requested resource; a unit configured to store a history of the resource; a unit configured to cause a display unit to display a screen that is based on the acquired resource and includes an input portion for receiving an input of a return instruction instructing that an immediately previous screen be returned to; and a control unit configured to determine whether or not an immediately previous screen is a screen that is based on a resource stored in the history, according to an input received by the input portion, and if it is determined that the screen is not based thereon, transmit a message indicating that the return instruction has been made to a unit that has instructed the request of the resource, and if not, return the screen to an immediately previous screen according to the history.

Also, according to another aspect of the present invention, there is provided an information processing apparatus comprising: an acquisition unit configured to request a resource according to an instruction and acquire a requested resource; a storage unit configured to store a history of the resource; a display control unit configured to cause a display unit to display a screen that is based on the acquired resource and includes an input portion for receiving an input of a return instruction; and a decision unit configured to decide a return destination based on history information relating to a resource that was last to be requested in the history, according to an input of the return instruction, wherein the display unit is caused to display a screen that corresponds to the decided return destination.

According to the present invention, even if a user interrupts authorization processing that is being performed by an application via a Web browser, it is possible to return to an operation screen of the application.

Further features of the present invention will become apparent from the following description of exemplary embodiments with reference to the attached drawings.

BRIEF DESCRIPTION OF THE DRAWINGS

FIG. 6 is a sequence diagram illustrating an authorization processing cancellation flow in the first embodiment of the present invention.

FIGS. 7A, 7B, and 7C are examples of an URL used in the first embodiment of the present invention.

FIG. 8 is an example of application identification information that is held by an authorization control service in the first embodiment of the present invention.

FIG. 12 is a flowchart illustrating a processing flow when the application has received the authorization completion notification in the first embodiment of the present invention.

DESCRIPTION OF THE EMBODIMENTS

Embodiments for carrying out the present invention will be described below with reference to the drawings.

First Embodiment

Figure 1:
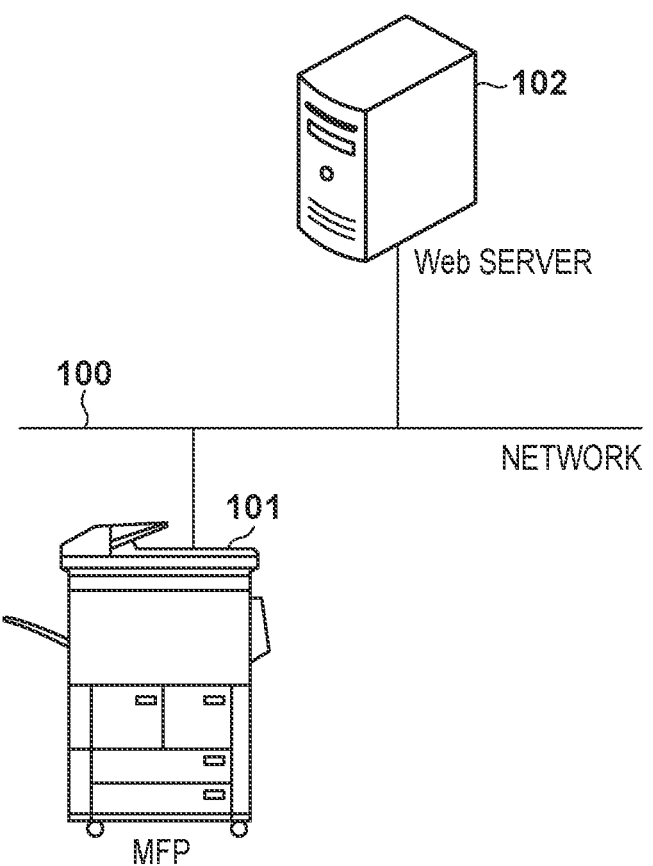
FIG. 1 is a diagram illustrating an entire system in which an MFP in a first embodiment of the present invention is connected.

FIG. 1 is an exemplary system configuration using an image processing apparatus. The system is constituted by an MFP 101, which is an image processing apparatus connected via a network 100, and a Web server 102. The network 100 is infrastructure for allowing the apparatuses to communicate with each other, and may be connected to the Internet. The MFP 101 is not limited to an MFP (Multiple Function Peripheral) as long as a Web browser function is included. The Web server 102 is connected to the MFP 101 via the network 100, and provides a Web service 500 according to a request from the MFP 101. Note that the MFP 101 may be referred to as an information processing apparatus, focusing on its processing capability.

Hardware Configuration of MFP

Figure 2:
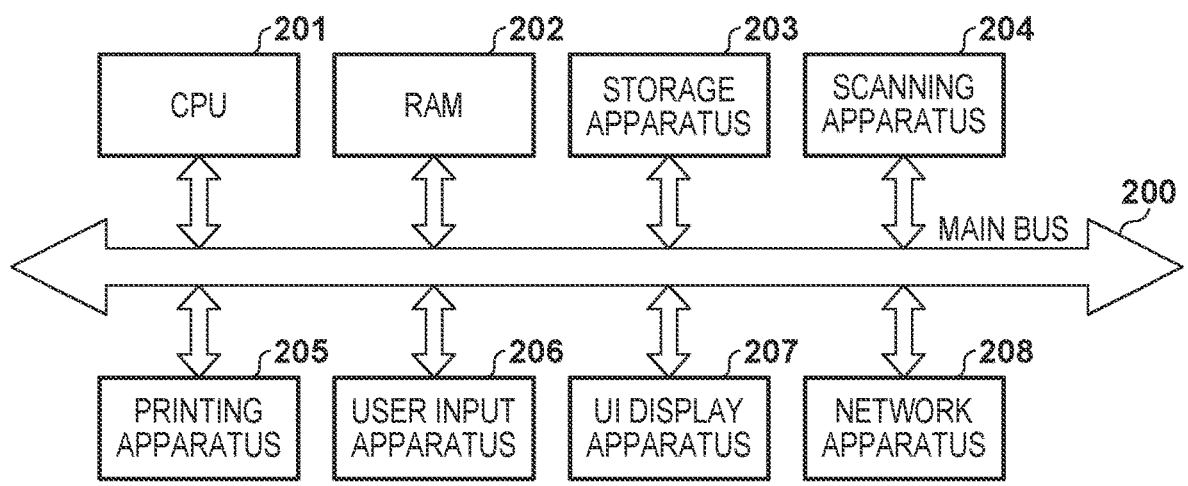
FIG. 2 is a block diagram illustrating a hardware configuration of the MFP in the first embodiment of the present invention.

FIG. 2 shows an example of a hardware configuration of the MFP 101 of the present embodiment. The MFP 101 includes a CPU 201 that controls the MFP 101, a RAM 202 that provides a work area for the CPU 201, and a storage apparatus 203 (may be an HDD, an NVRAM, or the like) for storing a program according to the present embodiment and various settings. The MFP 101 is further constituted by a scanning apparatus 204 that scans a document and generates document data, a printing apparatus 205 that prints the document data, a user input apparatus 206 for a user to input a command, a UI display apparatus 207 that displays a screen, a network apparatus 208 that communicates with another device via a network, and a main bus 200. Note that, in the present embodiment, the CPU 201 of the MFP 101 controls the RAM 202, the storage apparatus 203, the user input apparatus 206, the UI display apparatus 207, and the network apparatus 208 via the main bus 200, unless otherwise specified. Also, the UI display apparatus 207 may also function as the user input apparatus 206, in the manner of a touch panel display. The MFP 101 may include, in addition thereto, an image reading apparatus and an image printing apparatus that are connected to the main bus 200.

Hardware Configuration of Web Server

Figure 3:
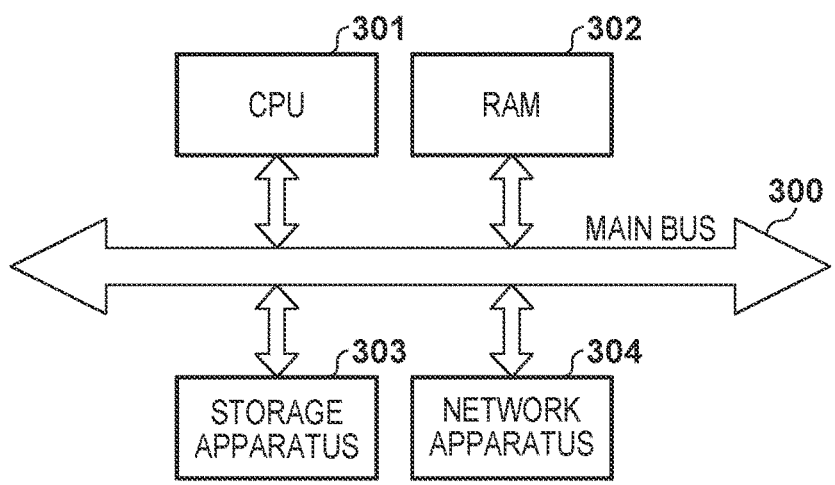
FIG. 3 is a block diagram illustrating a hardware configuration of a Web server in the first embodiment of the present invention.

FIG. 3 shows an example of the hardware configuration of the Web server 102 of the present embodiment. The Web server 102 includes a CPU 301 that controls the Web server 102, a RAM 302 that provides a work area for the CPU 301, a storage apparatus 303 (may be an HDD, an NVRAM, or the like) for storing a program according to the present embodiment and various settings, and a network apparatus 305 that communicates with another device via a network. Note that, in the Web server 102 of the present embodiment, the CPU 301 controls the RAM 302, the storage apparatus 303, and the network apparatus 304 via the main bus 300, unless otherwise specified.

Software Configuration of MFP

Figure 4:
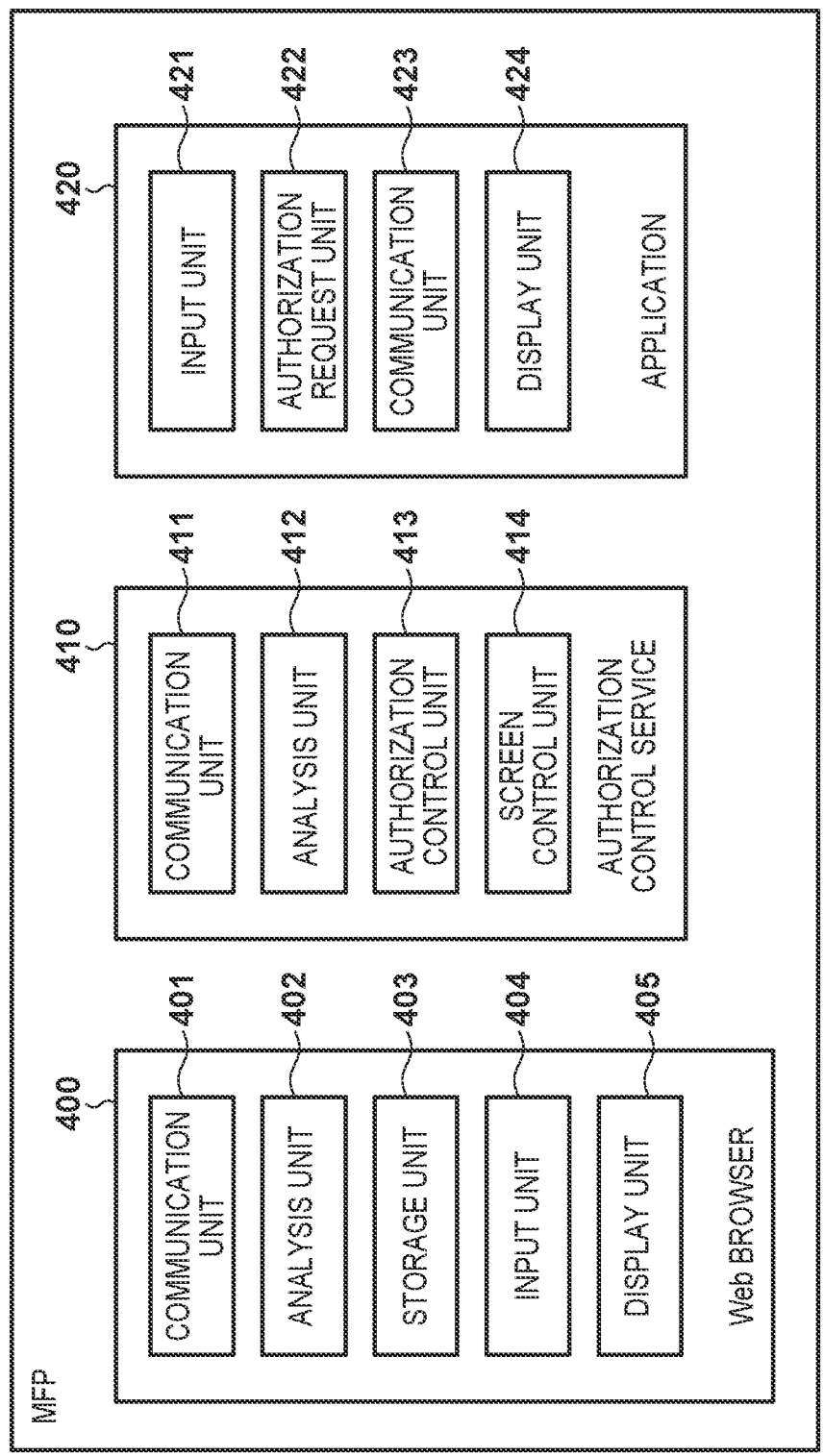
FIG. 4 is a block diagram illustrating a software configuration of the MFP in the first embodiment of the present invention.

FIG. 4 is a diagram illustrating a software configuration of the MFP 101 in the present embodiment. The functional units shown in FIG. 4 can each be realized by the CPU 201 included in the MFP 101 executing a control program. The MFP 101 includes a Web browser 400, an authorization control service 410, and an application 420.

It is sufficient that the Web browser 400 includes functions such as receiving Web content and displaying the Web content on a screen, and transmitting information input by a user, by communicating with a server. The Web browser 400 includes a communication unit 401, an analysis unit 402, a storage unit 403, an input unit 404, and a display unit 405. The communication unit 401 communicates with the Web server 102 and the authorization control service 410 in accordance with HTTP protocol. Specifically, the communication unit 401 transmits an HTTP request relating to an authorization request to the Web server 102, and receives an HTTP response including an authentication screen and an authorization code. Also, the communication unit 401 redirects the HTTP response including the authorization code to the authorization control service 410. The analysis unit 402 analyzes responses received from the Web server 102 and the authorization control service 410. The response includes pieces of information such as HTML data in which an operation screen of a Web application is described and a URI (Universal Resource Identifier) to which redirection is performed. The storage unit 403 stores an authorization mode designated by the authorization control service 410, a designated URI to be requested, and history information regarding Web pages, when it receives an authorization request from the authorization control service 410. The input unit 404 receives an operation input made by a user via the user input apparatus 206. The display unit 405 renders a Web application operation screen that is to be displayed in the UI display apparatus 207 based on an analysis result of the analysis unit 402. Note that the URI is identification information indicating a resource on a communication network such as the Internet, and is a piece of location information for specifying the resource, including the location on the network.

The authorization control service 410 makes a control instruction to the Web browser 400 in accordance with OAuth 2.0, and acquires an authorization code requested by the application 420. The authorization control service 410 includes a communication unit 411, an analysis unit 412, an authorization control unit 413, and a screen control unit 414. The communication unit 411 communicates with the Web browser 400 in accordance with HTTP protocol. Specifically, the communication unit 411, upon receiving an HTTP request notifying authorization completion from the Web browser 400, transmits an HTTP response indicating authorization completion to the Web browser 400. The analysis unit 412 analyzes an authorization completion notification that the communication unit 411 has received, and analyzes whether the authorization processing has succeeded or been cancelled, and the like. The authorization control unit 413, upon receiving an authorization request from the application 420, stores an application identifier of the application 420, and instructs the Web browser 400 to open the URI of the Web server 102 that was instructed by the application 420. Also, the authorization control unit 413 notifies the application 420 indicated by the stored application identifier of an authorization code or the fact that the authorization was cancelled, based on the analysis result of the analysis unit 412. The screen control unit 414, upon accepting an authorization request of the application 420, displays an operation screen of the Web browser 400 in the UI display apparatus 207. As a result, the operation screen displayed in the UI display apparatus 207 transitions from the application 420 to the Web browser 400.

The application can have various functions, and the application 420 of the present example functions as a portal for using a Web service (or a Web application). The application 420 is activated according to an instruction to activate the application 420 that the user has input in a basic menu screen, for example, and displays a user interface. The application 420 executes, according to a predetermined operation on the user interface, a procedure for using a Web service that is associated with the operation. Of course, this is merely an example. The application 420 includes an input unit 421, an authorization request unit 422, a communication unit 423, and a display unit 424. The input unit 421 accepts an operation input to the application 420, via the user input apparatus 206. The authorization request unit 422 requests the authorization control service 410 to start authorization processing. Specifically, the authorization request unit 422 designates an authorization mode to the Web browser 400, and requests the transmission of an HTTP request to a URI provided by the Web service 500 of the Web server 102. Also, the authorization request unit 422, upon the authorization processing being completed, receives an authorization completion notification including an authorization code or a notification indicating that the authorization was cancelled, from the authorization control service 410. The communication unit 423 communicates with the Web server 102 in accordance with HTTP protocol. Specifically, the communication unit 423, upon receiving an authorization code from the authorization control service 410, transmits the authorization code to the Web server 102, and receives an access token. Furthermore, the communication unit 423 makes a request, to which the acquired access token is added, to use various Web services to the Web server 102.

The display unit 424 renders an application operation screen to be displayed in the UI display apparatus 207.

The application 420 is installed in an application platform provided on an operating system of the MFP 101, and is executed, for example. The application platform is a Java (registered trademark) execution environment, for example, and in this case, the application 420 is coded using Java (registered trademark). This application 420 can be called from a basic menu screen displayed in the UI display apparatus 207, and executed, for example. Then, as a result of the application 420 being executed, an application operation screen in place of the basic menu screen is displayed. The user can use functions provided by the application 420 by operating the application operation screen. This application 420 is embedded in the MFP 101 and is used for some of the functions provided by the MFP 101, and as a result, the application 420 is also referred to as an embedded application. The application 420 can be installed as an addition, and can be uninstalled.

Software Configuration of Web Server

Figure 5:
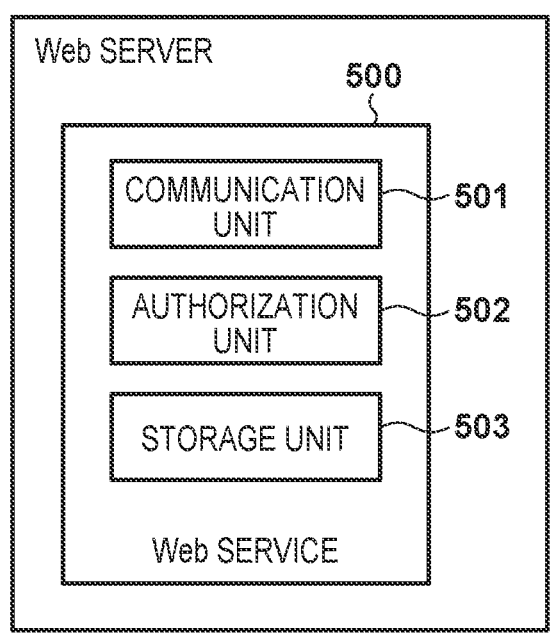
FIG. 5 is a block diagram illustrating a software configuration of the Web server in the first embodiment of the present invention.

FIG. 5 is a diagram illustrating a software configuration of the Web server 102 in the first embodiment of the present invention. The functional units shown in FIG. 5 can each be realized by the CPU 301 included in the Web server 102 executing a control program. Note that, in the following description, the client that is a communication partner of the Web server 102 is the MFP 101, but this is for the sake of describing the present embodiment, and the client is not limited to the MFP 101. The Web service 500 includes a communication unit 501, an authorization unit 502, and a storage unit 503. The communication unit 501 communicates with the MFP 101 in accordance with HTTP protocol. Specifically, the communication unit 501 receives an HTTP request from the Web browser 400 or the authorization control service 410, and transmits an HTTP response. The authorization unit 502 authorizes the MFP 101 to use various Web services provided by the Web server 102 in conformity with OAuth 2.0. Specifically, the authorization unit 502, upon the communication unit 501 receiving an authorization request, generates a response including an authentication screen. Also, the authorization unit 502, upon the communication unit 501 receiving authentication information, determines whether or not the authentication information is valid by checking a database, and if the authentication information is valid, generates a response including an authorization code. Also, the authorization unit 502, upon the communication unit 501 receiving an access token request along with a valid authorization code, generates a response including an access token. Also, the authorization unit 502, upon the communication unit 501 receiving various Web service use requests, determines whether or not the access token included in an HTTP request is valid. If the access token is valid, the Web service use request is accepted, and if not, the Web service use request is denied. The storage unit 503 manages various types of document files. Specifically, the storage unit 503 provides a document management service as an example of the Web service provided by the Web server 102. For example, the storage unit 503, upon the communication unit 501 receiving a request to refer to a document file list, generates an HTTP response including a list of document file names. Also, the storage unit 503, upon the communication unit 501 receiving a request to acquire a document file, generates an HTTP response including the document file data. Also, the storage unit 503, upon the communication unit 501 receiving a request to upload a document file, stores the document file name and the document file data, and generates an HTTP response for replying to the upload result.

Authorization Processing Cancellation Sequence

FIG. 6 is a sequence diagram illustrating an authorization processing cancellation flow and a message flow in the first embodiment of the present invention. In step S601, the application 420 requests the authorization control service 410 to start authorization processing according to an instruction made by the user. If the application 420 is associated with the Web service 500, it is sufficient that the instruction from a user is an instruction for executing or activating the application 420. Here, the application 420 designates an authorization request URI for requesting authorization to the Web service 500. FIG. 7A is an example of the authorization request URI for requesting authorization to the Web service 500 in the first embodiment of the present invention. The URI includes the response type, a client ID, and a redirect URI as parameters in the query string in accordance with OAuth 2.0. The URI "http://127.0.0.1/auth/xxxxxx" set as the redirect URI indicates an authorization completion notification URI for the Web browser 400 that notifies the authorization control service 410 of the authorization code. "xxxxxx" of the URI is an application identifier for identifying the application 420. The IP address "127.0.0.1" is a local loopback address. With this URI, the notification destination of the authorization code is specified as the application 420 via the authorization control service 410. In the first embodiment of the present invention, one application 420 is included, but a configuration in which a plurality of applications 420 execute the authorization processing may be adopted.

Next, in step S602, the authorization control service 410 starts accepting an authorization completion notification (that is, authorization code) from the Web browser 400 based on a request to start the authorization processing from the application 420. FIG. 8 is an example of application identification information that is held by the authorization control service 410 in the first embodiment of the present invention. The authorization control service 410 saves the authorization completion notification URI "/auth/xxxxxx" and the application identifier "xxxxxx" included in the authorization request URI designated by the application 420 as the application identification information.

Next, in step S603, the authorization control service 410 designates the authorization mode, and instructs the Web browser 400 to transmit an HTTP request to the authorization request URI instructed by the application 420. This instruction may include a redirect instruction to the designated authorization request URI, for example. The instruction in step S603 is an instruction from the authorization control service 410, but it can also be said that this instruction is an instruction whose source is the application 420. In step S604, the Web browser 400 transmits, to the Web service 500, an HTTP request to the authorization request URI. In step S605, the Web service 500 transmits an HTTP response including an authentication screen to the Web browser 400. In step S606, the Web browser 400 renders an authentication screen based on the HTTP response received from the Web service 500.

Figure 9:
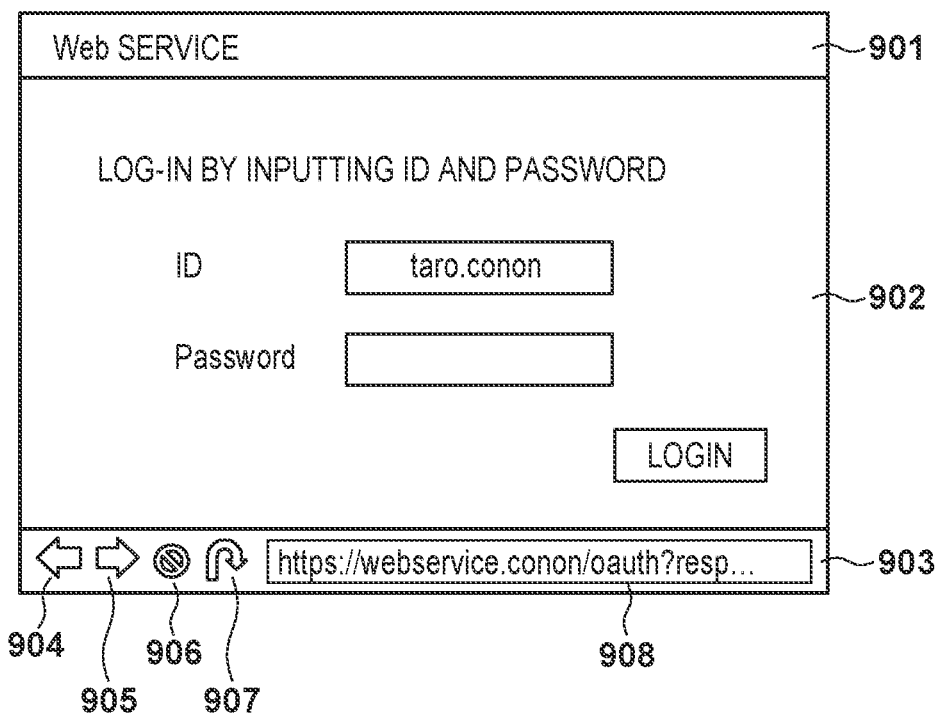
FIG. 9 is an example of an operation screen of a Web browser in the first embodiment of the present invention.

In step S607, the authorization control service 410 performs display control such that the operation screen of the Web browser 400 is displayed in the UI display apparatus 207. Accordingly, the authentication screen rendered by the Web browser 400 is displayed in the UI display apparatus 207. In FIG. 6, step S607 is executed after step S606, but step S607 may be executed immediately after the Web browser 400 is activated in step S603, for example. FIG. 9 is an example of the operation screen of the Web browser 400 in the first embodiment of the present invention. The operation screen of the Web browser 400 includes a title bar 901, a Web content region 902, and a tool bar 903. The title bar 901 is a region for displaying the title of Web content. The Web content region 902 is a region in which Web content received as the HTTP response is rendered, and the authentication screen that the Web browser 400 has received from the Web service 500 is rendered in this region. The authentication screen includes a user ID input field for receiving input of a user ID, a password input field for receiving input of a password, and a login button for instructing logging-in by transmitting the input user ID and password to the Web service 500. The tool bar 903 includes a return button 904, a forward button 905, a stop button 906, an update button 907, and a URI bar 908. The return button 904 is a UI for instructing that the previous operation screen be displayed with reference to history information of Web pages managed by the Web browser 400. The forward button 905 is a UI for instructing that the next operation screen be displayed with reference to the history information of Web pages managed by the Web browser 400. The stop button 906 is a UI for instructing that communication processing and rendering processing of the Web browser 400 be stopped. The update button 907 is a UI for making an instruction to communicate with the Web server 102 again, re-acquire Web content, and re-render the Web content region. The URI bar 908 is a UI for displaying the URI of the Web content currently displayed.

Next, in step S608, when the user has pressed the return button 904, the Web browser 400 starts processing (detail will be described later) shown in FIG. 10, for example, and transmits, to the authorization control service 410, an HTTP request including a URI indicating an instruction to return (simply referred to as "return instruction" as well), according to the processing. FIG. 7B is an example of a URI indicating a return instruction to be transmitted to the authorization control service 410 in the first embodiment of the present invention. The URI indicating the return instruction is obtained by adding a parameter "return" indicating the return instruction, in a query string, to the authorization completion notification URI "http://127.0.0.1/auth/xxxxxx" indicating the notification destination. This URI indicates the authorization control service 410 that has instructed the resource request. When the authorization processing of OAuth 2.0 is executed, the Web browser 400 normally transmits an authorization code to the authorization control service 410 by redirecting a response that includes an authorization code received from the Web service 500 as a parameter of the query string. The authorization code is delivered from the authorization control service 410 to the application 420. The application 420 acquires the access token using the authorization code, and accesses the Web service 500. On the other hand, if the user has instructed that the authorization processing be cancelled by pressing the return button 904, the Web browser 400 transmits a return instruction to the authorization control service 410, in the present embodiment. This is realized by transmitting an HTTP request to the URI shown in FIG. 7B, for example.

In step S609, the authorization control service 410 notifies the application 420 of authorization cancellation. In step S610, the application 420 generates or renders an authentication cancellation screen as an operation screen for indicating the fact that the authentication has been cancelled. In step S611, the authorization control service 410 displays an operation screen of the application 420 in the UI display apparatus 207. Next, in step S612, the authorization control service 410 deletes the stored application identification information, and ends the accepting of an authorization code for the application 420. Finally, in step S613, the authorization control service 410 transmits an HTTP response, to the Web browser 400, indicating that the authorization processing has ended.

On the other hand, if, in the operation screen 901, pieces of the user information such as a user ID and a password were input and the login button has been pressed, the Web browser 400 transmits the input user information to the Web service 500 that transmitted the operation screen information. The authorization unit 502 of the Web service 500, if successful in authentication of the user information, transmits an authorization code to the Web browser 400. The Web browser 400 transmits an authorization completion notification including the authorization code to the redirect URI in the authorization request URI. In the example shown in FIG. 7A, the address is a URI "http://127.0.0.1/auth/xxxxxx". The operation of the authorization control service 410 that has received a "return" instruction or an authorization code will be described later with reference to FIG. 11.

"Return" Processing by Web Browser of MFP

Figure 10:
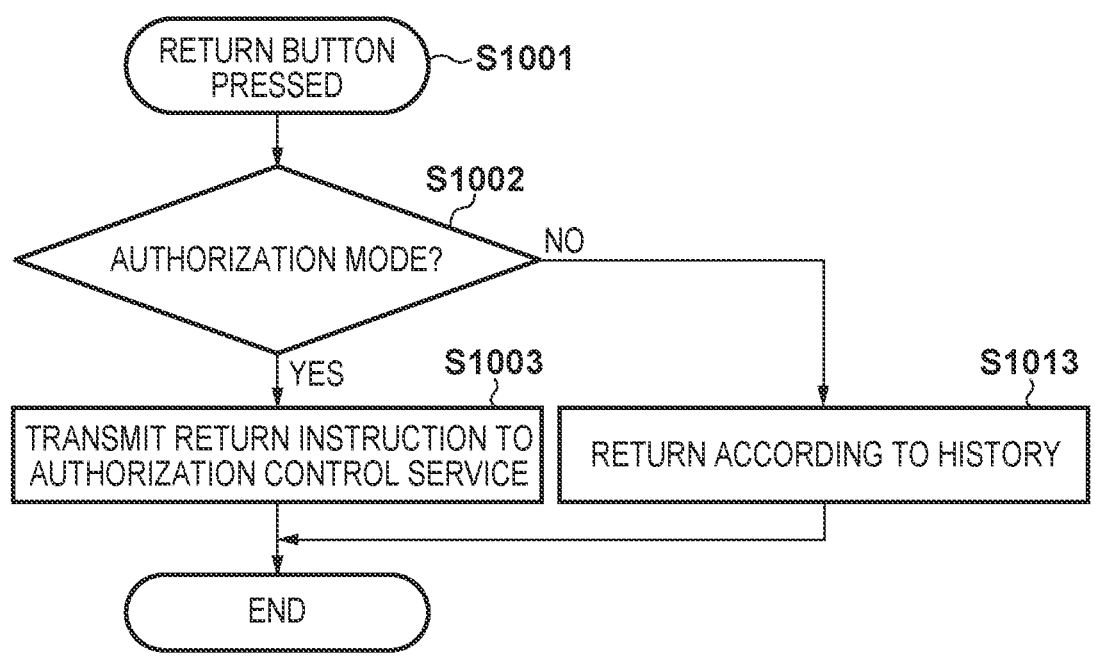
FIG. 10 is a flowchart illustrating a processing flow of the Web browser when a return button is pressed in the first embodiment of the present invention.

FIG. 10 is a flowchart illustrating a processing flow of the Web browser 400 when the return button 904 is pressed in the first embodiment of the present invention. In step S1001, the input unit 404 of the Web browser 400 starts the processing flow when the return button 904 is pressed, and advances the processing to step S1002. In step S1002, the storage unit 403 of the Web browser 400 determines whether or not an authorization mode is stored, and if an authorization mode is stored, advances the processing to step S1003. Otherwise, the processing is advanced to step S1013. In step S1003, the communication unit 401 of the Web browser 400 transmits a return instruction to the authorization control service 410 illustrated in FIG. 9, and advances the processing to step S1004. On the other hand, in step S1013, the storage unit 403 of the Web browser 400 refers to the history information, opens the immediately previous Web page, and advances the processing to step S1004. In step S1004, the Web browser 400 ends the processing flow when the return button 904 is pressed.

Note that, the processing procedure in FIG. 10 may be coded in a program of the Web browser 400, or may be realized by a script. When realized by a script, the script is transmitted along with the instruction to cause the Web browser 400 to be displayed at the front in step S607 in FIG. 6. The script may be a script for rewriting the screen (that is, HTML data) displayed at that moment to a screen for executing step S1003 in FIG. 10 in response to "return" being pressed.

Processing by Authorization Control Service of MFP

Figure 11:
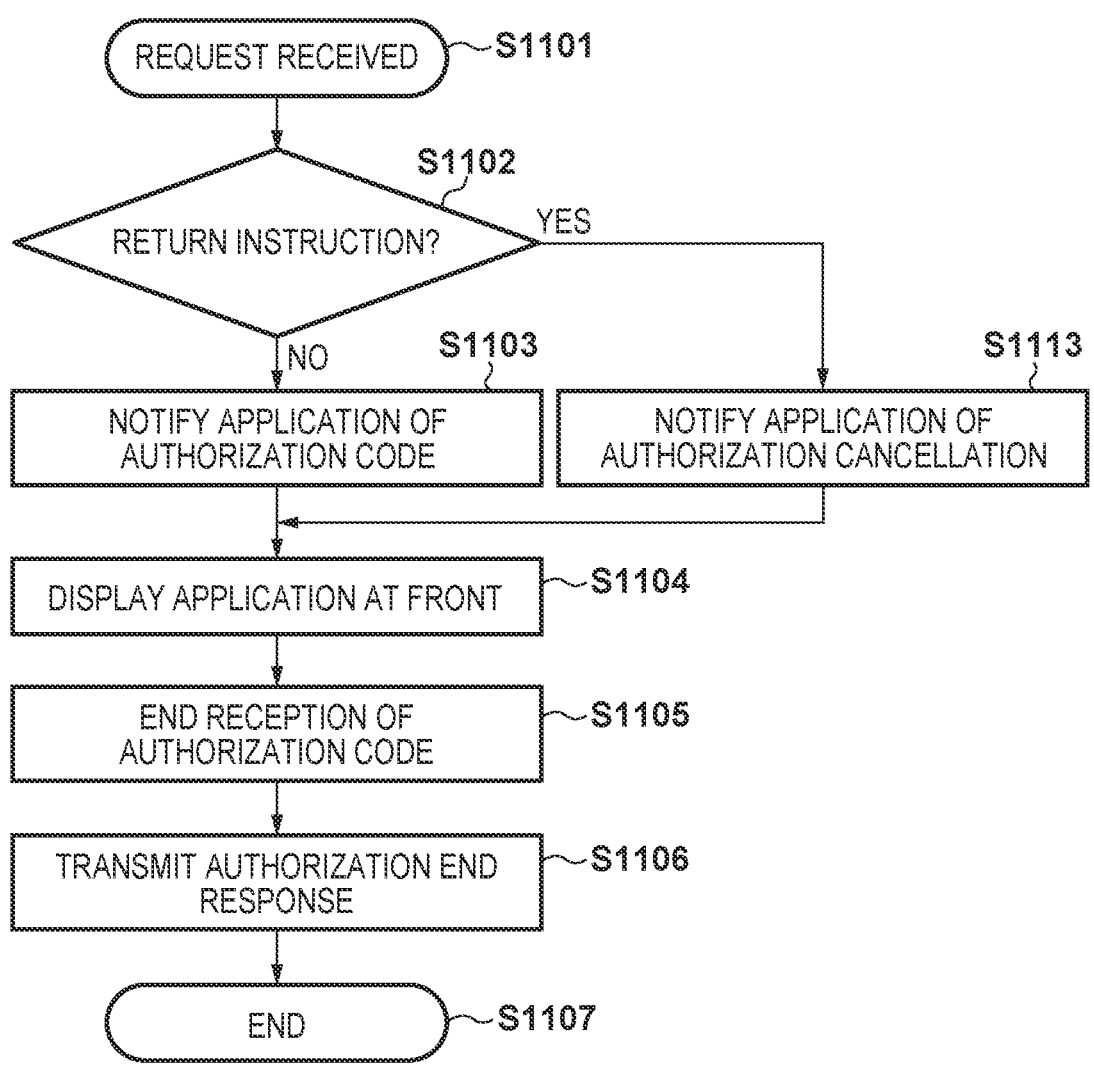
FIG. 11 is a flowchart illustrating a processing flow when an authorization control service has received an authorization completion notification in the first embodiment of the present invention.

FIG. 11 is a flowchart illustrating a processing flow when the authorization control service 410 has received an authorization completion notification in the first embodiment of the present invention. Note that, here, the authorization completion notification includes a "return" notification. In step S1101, the communication unit 411 of the authorization control service 410, upon receiving, from the Web browser 400, an HTTP request to the authorization completion notification URI, starts the processing flow, and advances the processing to step S1102. In step S1102, the authorization control unit 413 of the authorization control service 410 determines whether or not a return instruction is included in the HTTP request, and if the return instruction is determined to not be included, advances the processing to step S1103. On the other hand, if the return instruction is determined to be included, the processing is advanced to step S1113.

Specifically, in the case of the URI of a "return" instruction illustrated in FIG. 9, because the query string includes a parameter "return", the authorization control service 410 determines that the HTTP request is a return instruction by referring to this parameter.

In step S1103, the authorization control unit 313 of the authorization control service 410 notifies the application 420 of an authorization completion notification including the received authorization code along with the received authorization completion notification, and advances the processing to step S1104. FIG. 7C is an example of a URI indicating an authorization code to be transmitted to the authorization control service 410 in the first embodiment of the present invention. A parameter "code" indicating the authorization code is designated as a query string. In the example shown in FIG. 7C, the authorization control service 410 notifies the application 420 of a value "10y1LYh724IqxfieWqbs" designated by "code" as the authorization code. In step S1104, the screen control unit 314 of the authorization control service 310 displays an operation screen of the application 420 in the UI display apparatus 207, and advances the processing to step S1105. In step S1105, the authorization control unit 413 of the authorization control service 410 deletes the stored application identification information of the application 420, ends accepting of an authorization code, and advances the processing to step S1106. In step S1106, the authorization control service 410 transmits, to the Web browser 400, an HTTP response indicating that the authorization processing has ended, and advances the processing to step S1107. In step S1107, the authorization control service 410 ends the processing that is performed upon receiving the authorization completion notification.

On the other hand, in step S1113, the authorization control unit 413 of the authorization control service 410 notifies the application 420 of the authorization completion notification indicating cancellation of the authorization, and advances the processing to step S1104.

Reception Processing of Authorization Completion Notification by Application in MFP FIG. 12 is a flowchart illustrating a processing flow when the application 420 has received the authorization completion notification in the first embodiment of the present invention. In step S1201, the authorization request unit 422 of the application 420, upon receiving the authorization completion notification from the authorization control service 410, starts the processing flow, and advances the processing to step S1202. In step S1202, the authorization request unit 422 of the application 420 determines whether or not the authorization completion notification includes an authorization code, and if an authorization code is included, advances the processing to step S1203. Otherwise, the processing is advanced to step S1213.

In step S1203, the communication unit 423 of the application 420 transmits, to the Web service 500, an HTTP request, to which the acquired authorization code is added, for making a request to acquire the access token, and in response thereto, receives an HTTP response including the access token. The application 420, upon acquiring the access token, advances the processing to step S1204. In step S1204, the communication unit 423 of the application 420 transmits, to the Web service 500, an HTTP request, to which the access token is added, for requesting the acquisition of document list information, and in response thereto, receives an HTTP response including the document list information. The application 420, upon acquiring the document list information, advances the processing to step S1205. In step S1205, the display unit 424 of the application 420 renders an authentication success screen 1301 to be displayed in the UI display apparatus 207, and advances the processing to step S1206. In step S1206, the application 420 ends the processing that is performed upon receiving the authorization completion notification.

On the other hand, in step S1213, the authorization request unit 422 of the application 420 determines whether or not the authorization completion notification is authorization cancellation, and if it is authorization cancellation, advances the processing to step S1214. In other cases, the processing is advanced to step S1224. In step S1214, the display unit 424 of the application 420 renders an authentication cancellation screen 1302 to be displayed in the UI display apparatus 207, and advances the processing to step S1206. On the other hand, in step S1224, the display unit 424 of the application 420 renders an authentication error screen 1303 to be displayed in the UI display apparatus 207, and advances the processing to step S1206.

Operation Screen of Application

Figure 13A:
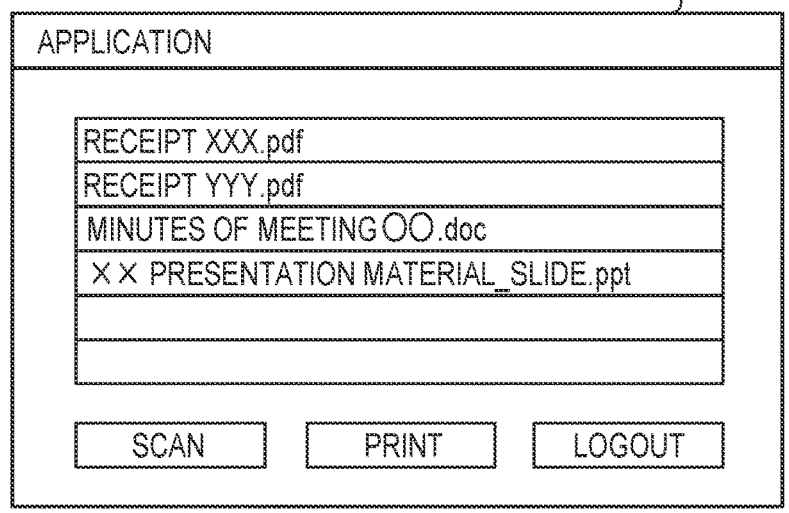
FIGS. 13A, 13B, and 13C are examples of an operation screen of the application in the first embodiment of the present invention.
Figure 13B:
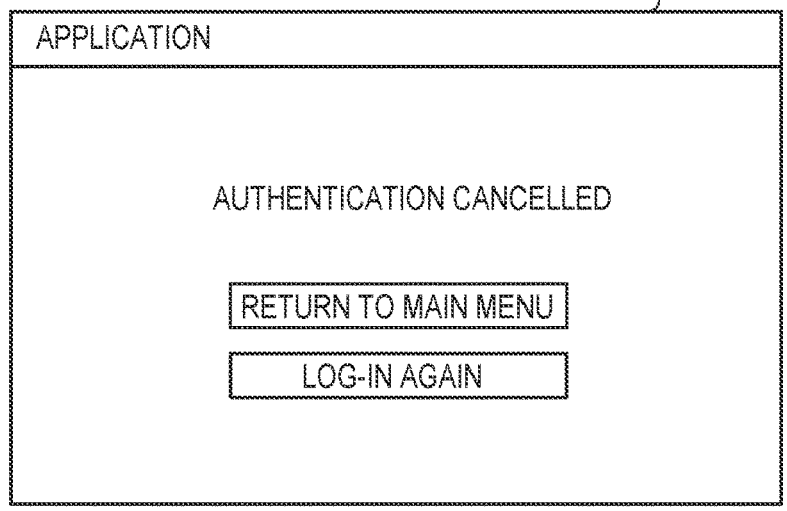
Figure 13C:
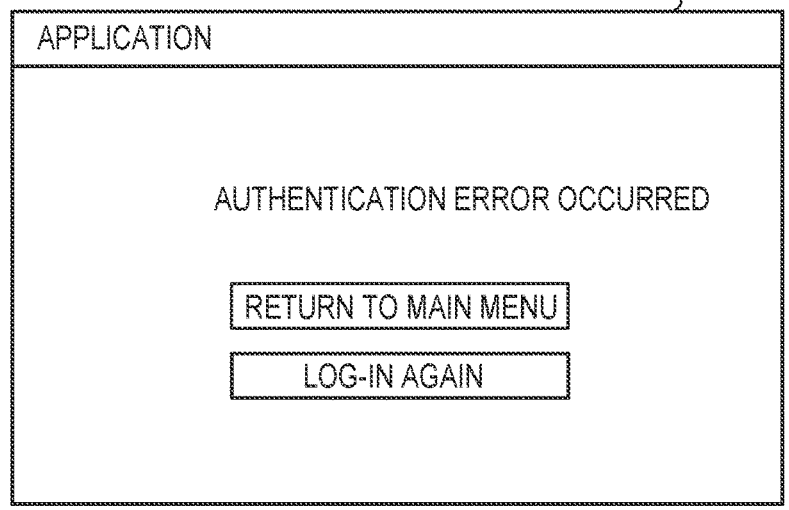

FIGS. 13A, 13B, and 13C are examples of the operation screen of the application 420 in the first embodiment of the present invention. The authentication success screen 1301 shown in FIG. 13A includes a document file list, a scan button, and a print button. The document file list is a UI for displaying a list of pieces of document file information that the application 420 has acquired from the storage unit 503 of the Web service 500 using the access token. The scan button is a UI for instructing that document data generated by controlling the scanning apparatus 203 be uploaded to the Web service 500. The print button is a UI for instructing the acquisition of the document file selected in the document file list from the Web service 500, and to print the acquired document file by controlling the printing apparatus 205. When the scan button or the print button is pressed, the sequence shown in FIG. 6 is started. When the application 420 receives an authorization completion notification, the procedure shown in FIG. 12 is executed.

The authentication cancellation screen 1302 shown in FIG. 13B is a screen for showing the fact that the authentication has been cancelled, and includes a UI for making an instruction to perform the authorization processing again. This screen 1302 is rendered in step S610 shown in FIG. 6, and is displayed. The authentication error screen 1303 shown in FIG. 13C is a screen for indicating that an error has occurred during the authentication, and includes a UI for making an instruction to perform the authorization processing again.

According to the configuration described above, the user can interrupt the authentication operation in the Web browser 400 during the authorization processing of the embedded application 420, and return to the operation screen of an embedded application.

Second Embodiment

Figure 14A:
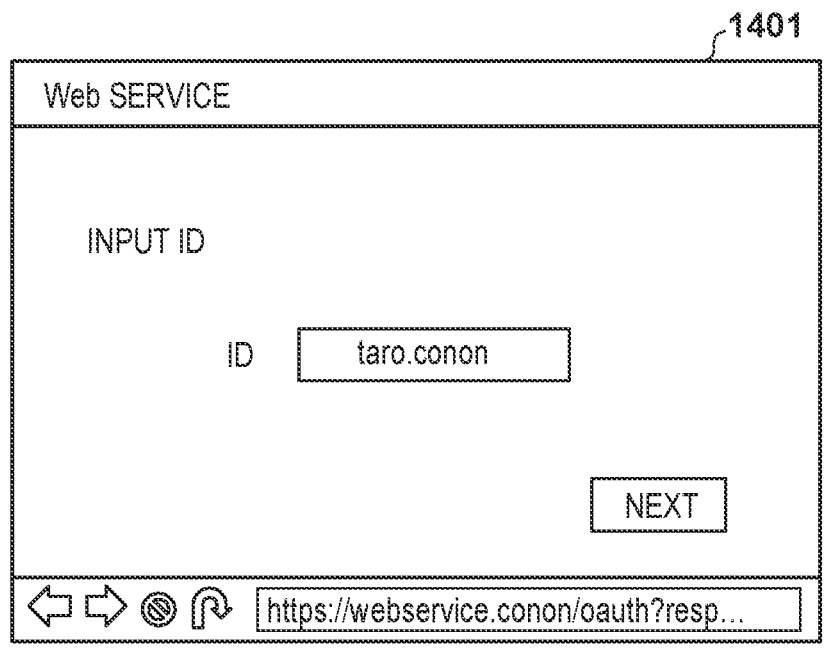
FIGS. 14A and 14B are examples of an authentication screen in a second embodiment of the present invention.
Figure 14B:
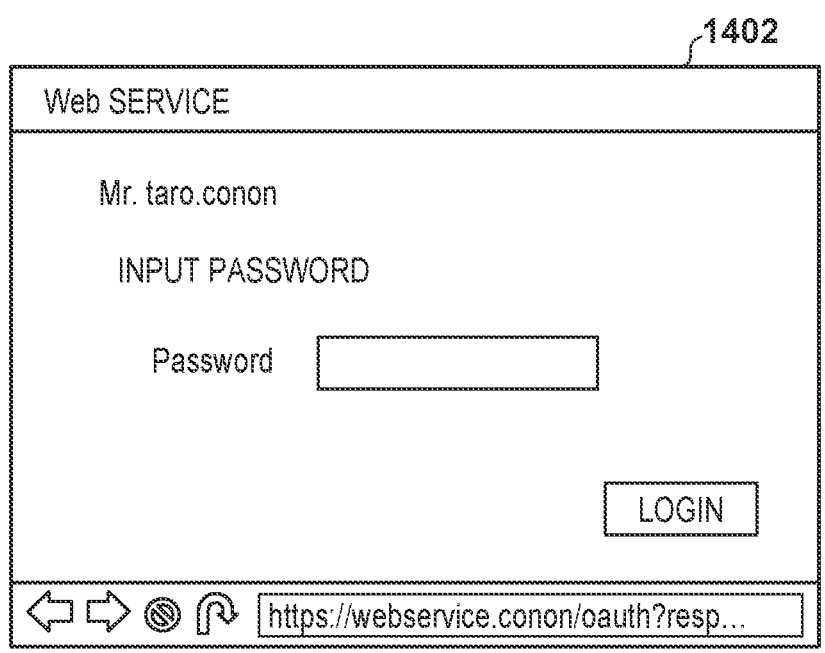

In the first embodiment of the present invention, as shown in the flowchart shown in FIG. 10, the Web browser 400 determines whether or not the authorization was requested in the authorization mode, and branches the processing between transmitting an instruction to return to the authorization control service 410 and returning according to the history. However, in the case where the authentication screen is constituted by two screens, namely an ID input screen 1401 and a password input screen 1402 as shown in FIGS. 14A and 14B, and the screen transitions from the ID input screen 1401 to the password input screen 1402, there is a problem in that, even if the user presses a return button in order to re-input a user ID while the password input screen 1402 is displayed, the screen returns to an operation screen of the application 420.

Therefore, as a second embodiment of the present invention, the Web browser 400 may perform control such that, when the return button is pressed, if an operation screen indicated by an authorization request URI is displayed, the screen returns to an application screen, and otherwise, the screen returns according to the history.

Processing Performed by Web Browser when Return Button is Pressed

Figure 15:
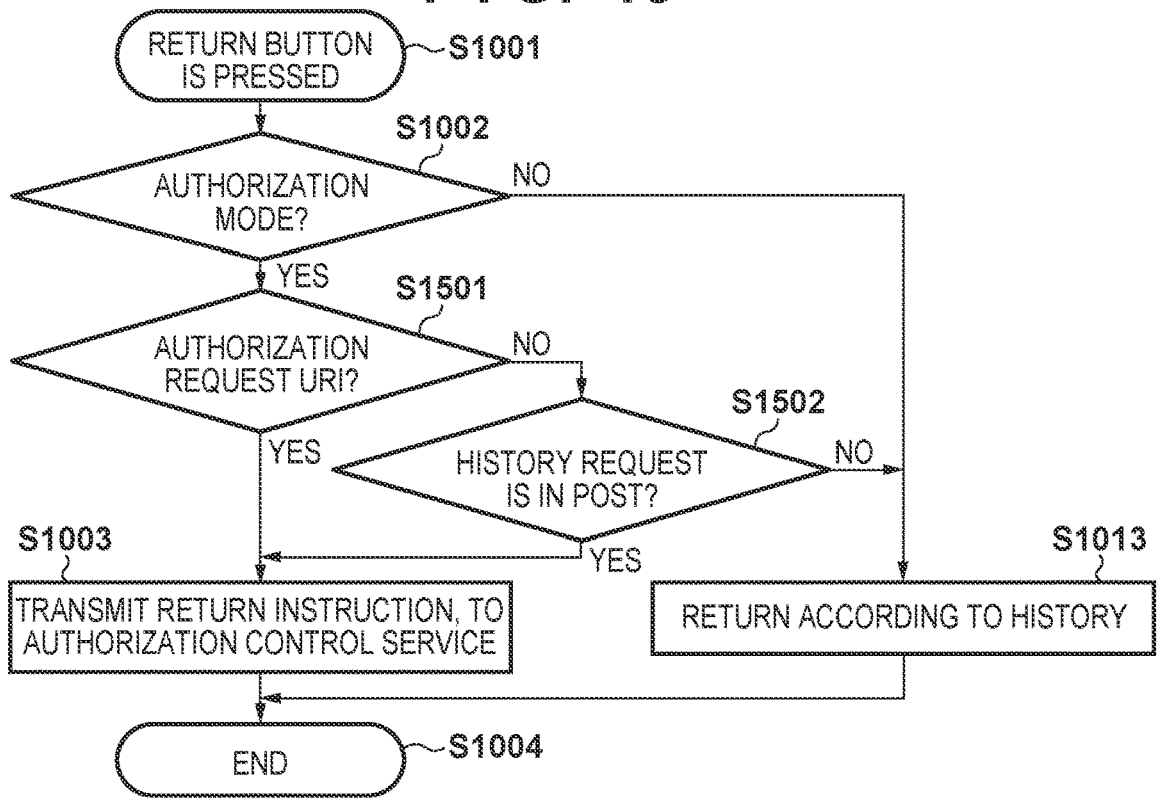
FIG. 15 is a flowchart illustrating a processing flow of a Web browser when a return button is pressed in the second embodiment of the present invention.

FIG. 15 is a flowchart illustrating a processing flow of the Web browser 400 when the return button is pressed in the second embodiment of the present invention. The difference from the flowchart shown in FIG. 10 in the first embodiment of the present invention is the point that, if the storage unit 403 of the Web browser 400 determines, in step S1002, that an authorization mode is stored, the processing is advanced to step S1501. In step S1501, the storage unit 403 of the Web browser 400 determines whether or not the URI of the currently displayed Web page is an authorization request URI, and if it is determined as being an authorization request URI, advances the processing to step S1502. Otherwise, the processing is advanced to step S1013. The authorization request URI is a URI illustrated in FIG. 7A, and the URI of the screen rendered in step S606 in FIG. 6 in response to the authorization request transmitted in step S604 is the authorization request URI. In step S1502, the storage unit 403 of the Web browser 400 determines whether or not the method of the HTTP request included in the history information is a predetermined type such as POST, and if the method is POST, advances the processing to step S1003. If the method is not POST, the "return" button is judged to have been pressed in the password input screen, and the processing is advanced to step S1113. In step S1013, the screen returns according to the history.

In the case where the authentication screen is divided into the ID input screen 1401 and the password input screen 1402, as shown in FIGS. 14A and 14B, in a normal processing flow, a GET method is used in screen transition from the ID input screen 1401 to the password input screen 1402, and the ID and password are submitted from the password input screen using the POST method. Accordingly, when the password input screen 1402 is displayed, the method of the last HTTP request recorded in the history information is the GET method, and is not the POST method. Therefore, in step S1502, the Web browser 400 determines whether or not the authentication operation has ended by determining whether or not the last HTTP request used the POST method.

As a result of performing control in this way, in the case where the user ID and the password are input in separate screens, if the "return" button is pressed in the latter of the two screens, the screen is returned to the previous screen according to the history held in the Web browser 400. On the other hand, if the "return" button is pressed in the former of the two screens, the processing can be returned to the authorization control service 410, similarly to the first embodiment. Note that because the reason of the judgement in step S1502 is as described above, whether or not the last request recorded in the history uses the GET method is judged in step S1502, and the processing may be branched to step S1013 if the method is the GET method, and to step S1003 if not.

Modification 1

Figure 16:
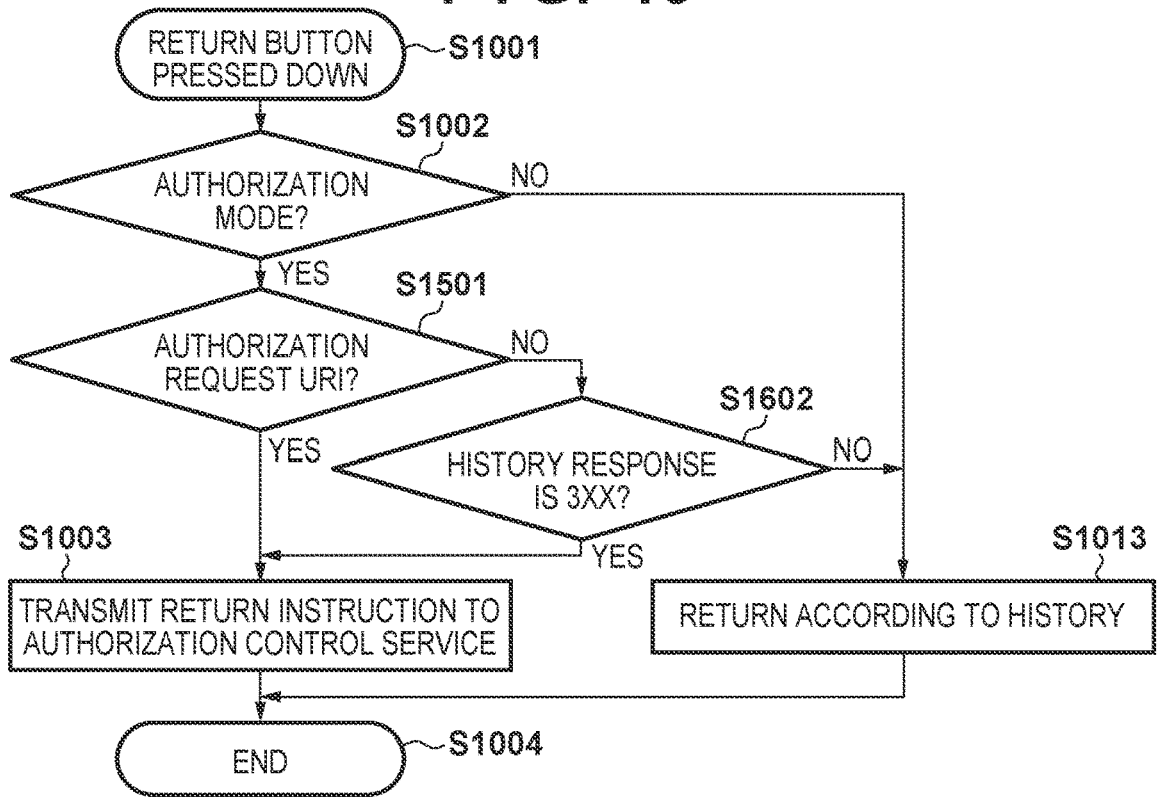
FIG. 16 is a flowchart illustrating a processing flow of the Web browser when the return button is pressed in Modification 1 of the second embodiment of the present invention.

FIG. 16 is a flowchart illustrating a processing flow of the Web browser 400 when the return button is pressed in Modification 1 of the second embodiment of the present invention. The difference from the processing flow shown in FIG. 15 is the point that the process in step S1602 is executed instead of the process in step S1502. In step S1602, the storage unit 403 of the Web browser 400 determines whether or not the status code of the HTTP response included in the history information is 3xx, and if the status code is 3xx, advances the processing to step S1003. Otherwise, the "return" button is determined to have been pressed in the password input screen, and the processing is advanced to step S1113. In the case of submitting authentication information (or also referred to as user information) from the authentication screen, in a normal processing flow, the Web browser 400 receives a response whose status code is 3xx, regardless of whether or not the authentication was successful. Accordingly, in step S1602, the Web browser 400 determines whether or not the authentication operation has ended by determining whether or not the status code of the HTTP response is 3xx.

Note that the basic form and Modification 1 of the second embodiment may be combined, and the Web browser 400 may decide the processing flow by determining whether the HTTP request in the history information uses the POST method, and by determining whether or not the status code of the HTTP response in the history information is 3xx.

Modification 2

Figure 17:
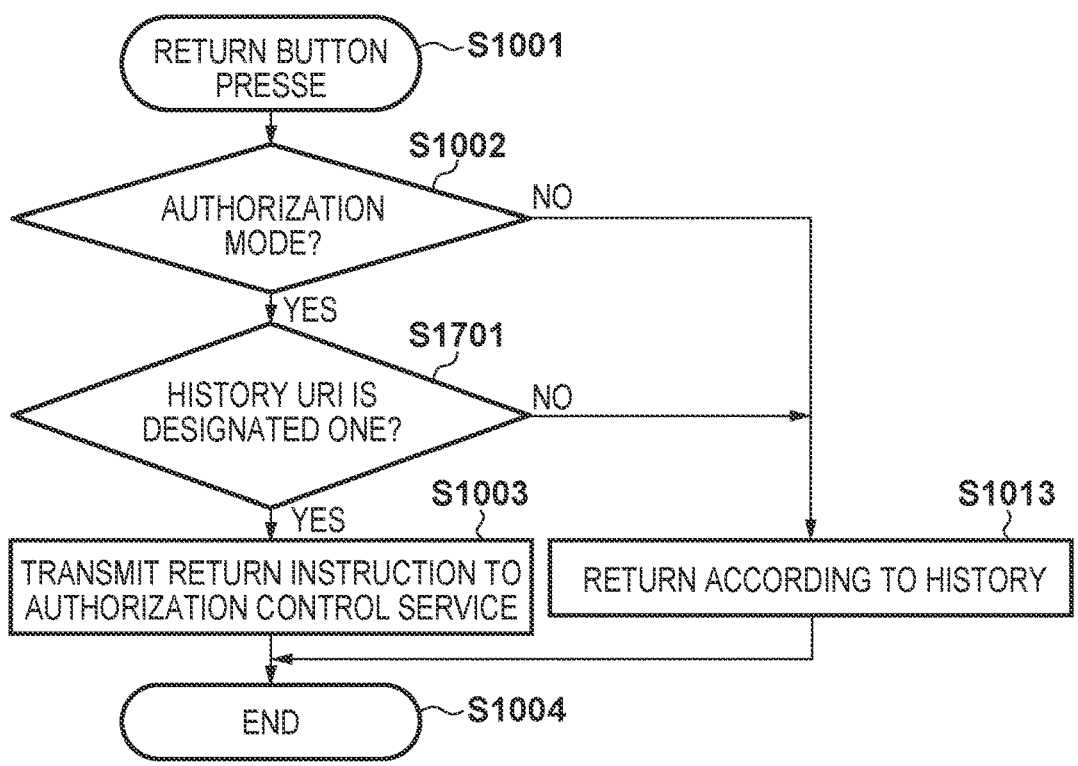
FIG. 17 is a flowchart illustrating a processing flow of the Web browser when the return button is pressed in Modification 2 of the second embodiment of the present invention.

In the above-described embodiments including Modification 1, the Web browser 400 determines and decides the processing flow when the return button is pressed, but the configuration may be such that, as a modification of the second embodiment to solve the same problem, the application 420 provides criterion for the "return" processing, and the Web browser 400 determines, based on the criterion, and decides the processing when the return button is pressed. Specifically, a configuration may be such that the application 420 designates a URI list of Web pages that should return to the operation screen of the application 420 when the return button is pressed, as information to be added to the authorization mode. FIG. 17 is a flowchart illustrating a processing flow of the Web browser 400 when the return button is pressed in Modification 2 of the second embodiment of the present invention. The difference from the first embodiment of the present invention is the point that, if the storage unit 403 of the Web browser 400 determines, in step S1002, that an authorization mode is stored, advances the processing to step S1701. In step S1701, the storage unit 403 of the Web browser determines whether or not the last URI recorded in the history information is included in the URI list to be added to the authorization mode, that is, whether or not the last URI matches any of the URIs included in the list, and if the last URI is included in the URI list, advances the processing to step S1003. Otherwise, it is determined that the "return" button has been pressed in the password input screen, and the processing is advanced to step S1013. In this case, when a URI that was not designated by the application 420 is recorded as the last URI of the history, instead of the password input screen, the return operation is performed according to the history. In the present modification, there is an effect in which the application 420 can more finely control the screen transition when the return button is pressed.

Third Embodiment

The configuration may be such that, as a third embodiment to solve the same problem, when the Web browser 400 transmits a return instruction to the authorization control service 410, information regarding the immediately previous Web page included in the history information is also transmitted. In this configuration, the Web browser 400 may behave like that in the first embodiment, the second embodiment, and the modifications, or may unconditionally transmit the return instruction to the authorization control service 410, when the return button is pressed. Note that, in the present embodiment, the Web browser 400 transmits, along with the return instruction, at least the last request and response that the Web browser 400 has recorded or one of the request and the response. The authorization control service 410, upon receiving this, transmits, to the application 420, a piece of information regarding the immediately previous Web page included in the history information along with the return instruction. The application 420 determines whether or not the operation screen of the application 420 is to be returned to, and notifies the authorization control service 410 of a screen transition instruction. For example, in step S609 in FIG. 6, the authorization control service 410 transmits a return instruction instead of the authorization cancellation, to the application 420. The application 420 determines whether or not to return to the operation screen by referring to the history information in a similar manner to how the Web browser 400 of the second embodiment performs determination. The application 420 transmits a screen transition instruction indicating whether or not the operation screen is to be returned to, based on the determination, to the authorization control service 410. If it is determined that the operation screen is to be returned to, the application 420 renders the authentication cancellation screen, for example.

Figure 18:
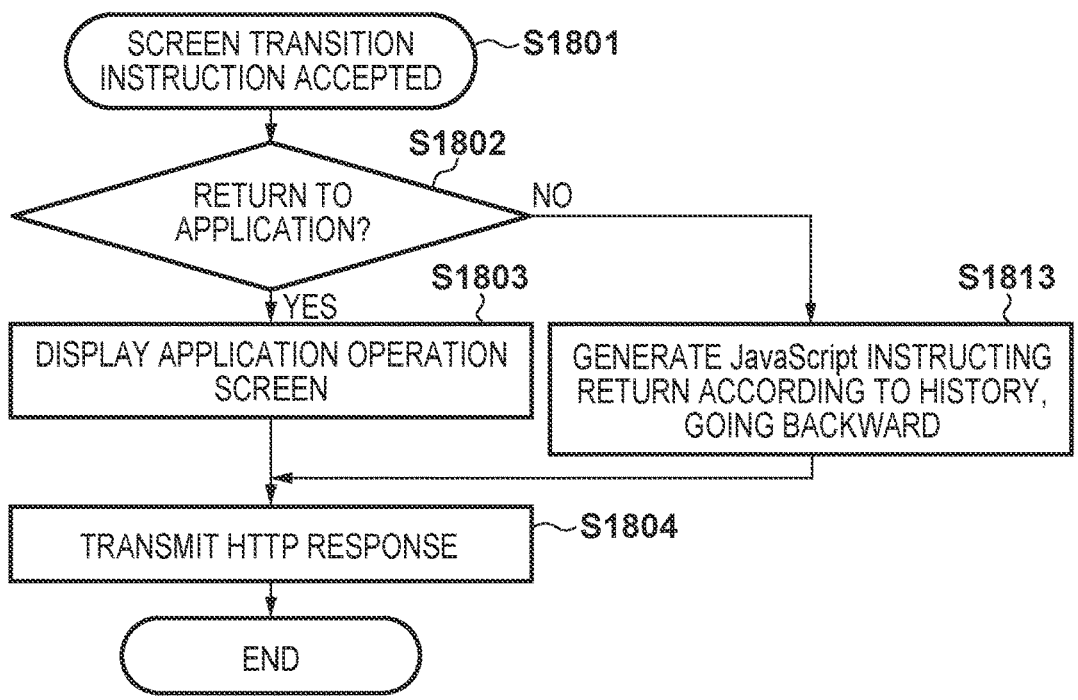
FIG. 18 is a flowchart illustrating a processing flow when an authorization control service has received an application screen transition instruction from the application, in a third embodiment of the present invention.

FIG. 18 is a flowchart illustrating a processing flow when the authorization control service 410 in the third embodiment of the present invention has received an application screen transition instruction from the application 420. In step S1801, upon the communication unit 411 of the authorization control service 410 receiving the screen transition instruction from the application 420, the processing is advanced to step S1802. In step S1802, the authorization control unit 413 of the authorization control service 410 determines whether or not the screen transition instruction is an instruction to return to the operation screen of the application 420, and if returning to the application operation screen is instructed, advances the processing to step S1803. Otherwise, the processing is advanced to step S1813.

In step S1803, the screen control unit 414 of the authorization control service 410 displays an operation screen of the application 420 in the UI display apparatus 207, and advances the processing to step S1804. In step S1804, the communication unit 411 of the authorization control service 410 transmits an HTTP response indicating that authorization processing has ended, to the Web browser 400.

On the other hand, in step S1813, the screen control unit 414 of the authorization control service 410 generates an HTTP response including JavaScript (registered trademark) for making an instruction to return to the immediately previous page in the history information of the Web browser 400. Specifically, the HTTP response includes a "history-.back( )" instruction. Then, the display unit 405 of the Web browser 400, based on the result of processing the JavaScript included in the HTTP response, performed by the analysis unit 402 of the Web browser 400, renders an immediately previous page of the history information stored in the storage unit 403 in the operation screen of the Web browser 400. In the present modification there is an effect in which, similarly to Modification 2, the application 420 can more finely control the screen transition when the return button is pressed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-046510, filed Mar. 10, 2017 which is hereby incorporated by reference herein in its entirety.

What is claimed is:

1. An information processing apparatus comprising:
one or more processors connected to one or more storages, the one or more processors being configured to:
by requesting a resource according to an instruction, acquire the requested resource;
store a history of the resource;
cause a display to display a screen that is based on the acquired resource and receiving an input of a return instruction instructing that an immediately previous screen be returned to;
determine whether or not an immediately previous screen is a screen that is based on a resource stored in the history, according to a received input, and if it is determined that the screen is not based thereon, transmit a message indicating that the return instruction has been made, and if not, return the screen to an immediately previous screen according to the history; and
set a first mode according to an instruction,
wherein if the first mode is set, it is determined that the immediately previous screen is not a screen that is based on a resource stored in the history.

2. The information processing apparatus according to claim 1, the one or more processors being configured to set a first mode according to an instruction, and determine that, if the first mode is set and the screen displayed by the display unit is based on a predetermined resource or the request of a last recorded resource in the history is in a predetermined format, the immediately previous screen is not a screen that is based on a resource stored in the history.

3. The information processing apparatus according to claim 1, the one or more processors being configured to set a first mode according to an instruction, and determine that, if the first mode is set and the screen displayed by the display unit is based on a predetermined resource or the response last recorded in the history includes a predetermined value, the immediately previous screen is not a screen that is based on a resource stored in the history.

4. The information processing apparatus according to claim 1, the one or more processors being configured to set a first mode according to an instruction, and determine that, if the first mode is set and the last recorded resource in the history matches a designated resource, the immediately previous screen is not a screen that is based on a resource stored in the history.

5. The information processing apparatus according to claim 1, the one or more processors being configured to receive the instruction to set the first mode from an authorization control service, based on a request from an application,
wherein a resource designated by the authorization control service is acquired, based on the request from the application.

6. The information processing apparatus according to claim 5, being connected to a server that provides a service,
wherein the authorization control service designates the resource for performing an authorization request to the server,
the one or more processors being configured to
acquire a resource of an authentication screen with respect to the authorization request,
determine whether or not the immediately previous screen is a screen that is based on a resource stored in the history, in response the return instruction being input, and if it is determined that the screen is not based thereon, transmits a message indicating that the return instruction has been made in order to notify the application of authorization cancellation, and
display by the display unit an authentication cancellation screen generated by an application that has received the message.

7. An information processing apparatus comprising:
one or more processors connected to one or more storages, the one or more processors being configured to:
request a resource according to an instruction and acquire a requested resource;
store a history of the resource;
cause a display unit to display a screen that is based on the acquired resource and includes an input portion for receiving an input of a return instruction;
decide a return destination based on history information relating to a resource that was last to be requested in the history, according to an input of the return instruction;
cause the display unit to display a screen that corresponds to the decided return destination; and
set a first mode according to an instruction,
wherein if the first mode is set, it is determined that the immediately previous screen is not a screen that is based on a resource stored in the history.

8. The information processing apparatus according to claim 7, the one or more processors being configured to, if a displayed screen is based on a resource included in the history information, decide that an immediately previous screen is a return destination based on the history, and if not, decide that a screen of an application that has requested the resource is a return destination.

9. A non-transitory computer-readable storage medium which stores a program for causing a computer to:
by requesting a resource according to an instruction, acquire the requested resource;
store a history of the resource;
cause a display unit to display a screen that is based on the acquired resource and includes an input portion for receiving an input of a return instruction instructing that an immediately previous screen be returned to;
determine whether or not an immediately previous screen is a screen that is based on a resource stored in the history, according to an input received by the input portion, and if it is determined that the screen is not based thereon, transmit a message indicating that the return instruction has been made to a unit that has instructed the request of the resource, and if not, return the screen to an immediately previous screen according to the history; and
set a first mode according to an instruction,
wherein if the first mode is set, it is determined that the immediately previous screen is not a screen that is based on a resource stored in the history.

10. A non-transitory computer-readable storage medium which stores a program for causing a computer to:
request a resource according to an instruction and acquire a requested resource;
store a history of the resource;
cause a display unit to display a screen that is based on the acquired resource and includes an input portion for receiving an input of a return instruction;
decide a return destination based on history information relating to a resource that was last to be requested in the history, according to an input of the return instruction;
cause the display unit to display a screen that corresponds to the decided return destination; and
set a first mode according to an instruction,
wherein if the first mode is set, it is determined that the immediately previous screen is not a screen that is based on a resource stored in the history.

11. A display control method to be executed by an information processing apparatus, comprising:
acquiring, by requesting a resource according to an instruction, the requested resource;
storing a history of the resource;
causing a display unit to display a screen that is based on the acquired resource and includes an input portion for receiving an input of a return instruction instructing that an immediately previous screen be returned to;
determining whether or not an immediately previous screen is a screen that is based on a resource stored in the history, according to an input received by the input portion, and if it is determined that the screen is not based thereon, transmitting a message indicating that the return instruction has been made to a unit that has instructed the request of the resource, and if not, returning the screen to an immediately previous screen according to the history; and
setting a first mode according to an instruction,
wherein if the first mode is set, it is determined that the immediately previous screen is not a screen that is based on a resource stored in the history.

12. A display control method to be executed by an information processing apparatus, comprising:
requesting a resource according to an instruction and acquiring a requested resource;
storing a history of the resource;
causing a display unit to display a screen that includes an input portion for receiving an input of a return instruction, that is based on the acquired resource;
deciding a return destination based on history information relating to a resource that was last to be requested in the history, according to an input of the return instruction;
causing the display unit to display a screen that corresponds to the decided return destination; and
setting a first mode according to an instruction,
wherein if the first mode is set, it is determined that the immediately previous screen is not a screen that is based on a resource stored in the history.

* * * * *